Feb. 15, 1927.
F. A. BAILEY
1,617,562
WORK HOLDING MEANS
Filed Aug. 13, 1925
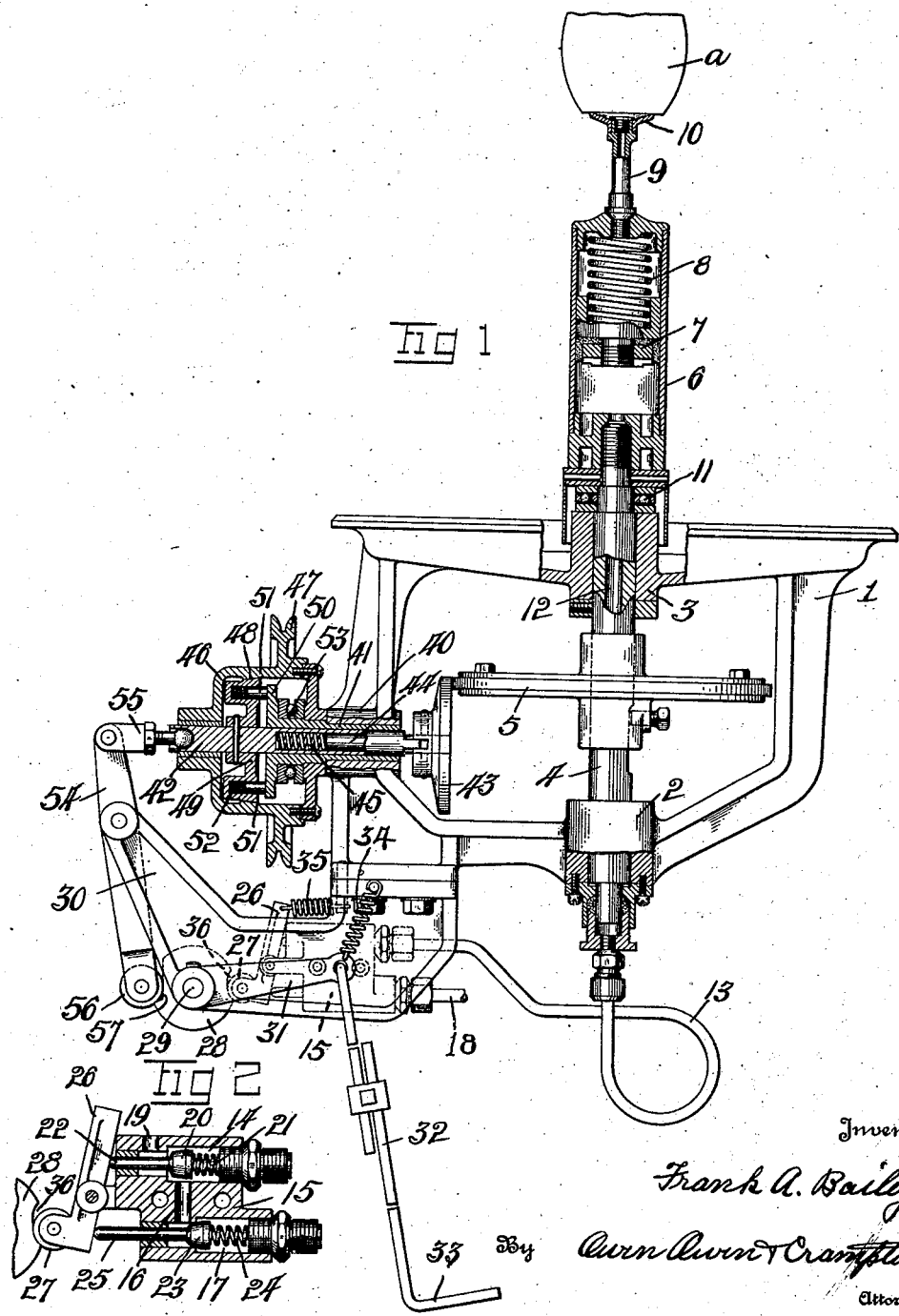
Inventor
Frank A. Bailey,
By Owen Owen & Crampton
Attorneys Patented Feb. 15, 1927.

1,617,562

UNITED STATES PATENT OFFICE.

FRANK A. BAILEY, OF TOLEDO, OHIO, ASSIGNOR TO THE DE VILBISS MANUFACTURING COMPANY, OF TOLEDO, OHIO, A CORPORATION OF OHIO.

WORK-HOLDING MEANS.

Application filed August 13, 1925. Serial No. 50,086.

This invention relates to means for holding a work-piece while being operated on, and which, in the present case, is adapted at the same time to impart rotary movement to the work.

The object of the invention is the provision of simple, efficient and novel means, which is operable to securely hold an article to a carrying part by suction and is also operable to effect a release of the article.

A further object of the invention is the provision, in combination with a rotatable work-holder or spindle, of unitary means for controlling the rotation of the work-holder and the holding of the work thereto.

Further objects and advantages of the invention will be apparent from the following detailed description thereof.

While the invention in its broader aspect is capable of embodiment in numerous forms, one embodiment thereof is illustrated in the accompanying drawings, in which,—

Figure 1 is a side elevation of an apparatus embodying the invention with parts in section, and Fig. 2 is an enlarged sectional detail of the air control means.

Referring to the drawings, 1 designates a frame having vertically aligned bearings 2 and 3 therein for a spindle or shaft 4, to which, in the present instance, intermediate the bearings is secured a friction wheel 5. On the upper end of the shaft 4 above the bearing 3 is secured a cylindrical shell 6 having a plunger 7 mounted for reciprocatory movements therein and impelled to have inward movement therein by a coiled expansion spring 8 disposed between the plunger and the outer end of the cylinder. A stem 9 projects axially from the outer end of the cylinder shell and has a passage throughout its length which communicates at its inner end with the interior of the cylinder. A rubber disc or cup 10 is secured to the outer end of the stem for rotation therewith and is intended to fit at its edge portion closely against an article or work-piece $a$ to firmly hold it to the cup for rotation therewith when a vacuum or suction action is created through the stem 9 by reason of an inward movement of the plunger 7. The cylinder 6 is enlarged with respect to the shaft 4 and has a thrust bearing 11 between its inner end and the bearing 3.

Air under pressure is admitted to the cylinder 6 at the inner side of the plunger 7 to force the plunger outward against the tension of the spring 8 to release the holding or suction action on the article $a$, and this air is introduced into the cylinder through a passage 12 provided axially through the shaft 4. A tube 13 is in stuffing-box connection at one end with the outer end of the shaft 4 and has its other end in communication with a valve chamber 14 provided in a frame part or block 15. The chamber 14 has communication through a passage 16 and valve chamber 17 with a tube 18 leading to a source of air pressure supply. The chamber 14 is also in communication with an exhaust passage 19 and such communication is normally closed by a valve 20 which is held seated by a spring 21 and has a stem 22 projecting from an end of the block 15. The communication between the supply chamber 17 and passage 16 is normally closed by a valve 23, which is seated by a spring 24, and has a stem 25 projecting from the same end of the block as the valve stem 22. It is evident that an inward movement on either valve stem 22 or 25 will effect an unseating of the associated valve.

A lever 26 is fulcrumed to the end of the block 15, from which the valve stems 22 and 25 project, and has one arm in engagement with one valve stem and its other arm in engagement with the other valve stem whereby an inward rocking of the lower arm of the lever, in the present instance, effects an opening of the supply valve 23 and permits a closing of the exhaust vale 20, and vice versa. A roller 27 is carried by the lower end portion of the lever 26 and rides on the periphery of a cam 28 fixed on a shaft journalled in an arm 30 of the frame 1. An arm 31 fixedly projects from the cam-shaft 29 and has a link or rod connection 32 with any suitable foot pedal or manual operating means, which, in the present instance, may comprise the foot-piece 33 on the lower end of the connection. The arm 31 is normally held elevated, which is accomplished, in the present instance, by a spring 34. A spring 35 acts on the lever 26 to retain its roller 27 in contact with the cam periphery.

When the control arm 31 is in its normal raised position, shown in Fig. 1, the lever roll 27 rests in a depression 36 in the periphery of the cam 28 and permits the lever 26 to stand in position to effect an opening of the exhaust valve 20 and permit a closing of the supply valve 23, as shown in Fig. 2. The cam depression 36 is of a length to require a predetermined movement of the cam 28 upon a depression of the arm 31 before the roller 27 will pass from the depression.

A side bearing 40 is provided in the frame 1 for receiving a hollow shaft 41 through which a shaft 42 projects for axial movements relative thereto, one end of said latter shaft carrying a drive disc 43 in driving engagement with the periphery of the wheel 5. While the disc 43 is secured to the inner end of the shaft 42 to turn therewith, it is in reality carried by a stem 44 projected axially from a socket in the inner end of the shaft 42 for axial movement therein. A spring 45 is mounted within the shaft 42 and acts on the stem to effect an outward pressure thereon, thereby maintaining a close driving contact of the disc 43 with the wheel 5, and also exerting an outward pressure on the shaft 42.

A hollow shell 46 is mounted at its outer end on the outer end portion of the shaft 42 and at its inner end on the shaft 41 for free turning movements relative thereto. This shell has, in the present instance, a pulley 47 on its outer periphery to adapt it to be connected to any suitable driving means and is provided interiorly with a conical clutch surface 48 with which a conical clutch wheel 49 fixed to the shaft 42 interiorly of the shell is adapted to have frictional clutch engagement. The end of the shaft 41 within the shell 46 is provided with an annular flange 50 from which pins 51 project into sockets in the clutch wheel 49 and receive the outward thrust of springs 52 in said sockets. A thrust bearing 53 is disposed between the inner end of the shell 46 and flange 50. It is apparent that the clutch member 49 is normally held in clutch engagement with the shell or drive clutch member 46 by the action of the springs 52, as well as the spring 45.

A lever 54 is fulcrumed to an upstanding part of the frame arm 30 and has its upper end in thrust connection with the outer end of the shaft 42 through a link 55 and is provided at its lower end with a roller 56 which rides on the periphery of the cam 28 and is held in engagement therewith by the outward thrust action on the shaft 42 of the springs 45 and 52. When the cam 28 is in the normal position shown, the roller 56 stands in a depression 57 in the cam, and immediately upon a movement of the cam from such normal position the roller is abruptly forced outward, thereby rocking the lever 54 and forcing the shaft 42 inward to carry the clutch member 49 therewith and release it from driving engagement with the drive member 46.

In the operation of the apparatus it will be understood that when the control means, for instance the arm 31, is in normal position the work-holding stem 9 will be rotated due to the driving engagement of the shell 46 with the clutch wheel 49 and the engagement of the drive disc 43 with the wheel 5 on the spindle or shaft 4 of the work-holder, and at the same time the supply valve 23 will be seated to close the communication between the interior of the cylinder 6 and source of air pressure supply, and the exhaust valve 20 will be open, thereby permitting exhaust to take place from the lower portion of the cylinder 6 and enabling the spring 8 to act to force the plunger 7 inward to effect a suction through the stem 9. When it is desired to remove the article $a$ from the holding stem 9 or to place an article in holding engagement therewith, the operator depresses the foot pedal 33, or otherwise operates the control to effect, in the present instance, a downward movement of the arm 31 from normal position and a rocking of the cam 28. When this rocking takes place the cam shaft acts on the clutch control lever 54 to effect an inward movement of the shaft 42 and a consequent release of the driving engagement of the shell or clutch member 46 with the clutch wheel 49, thereby stopping the rotation of the work-holder. The cam 28 next acts, upon a predetermined further rocking movement thereof, to move the air control lever 26 to permit a closing of the exhaust valve 20 and effect an opening of the air supply valve 23, thereby closing the exhaust from the cylinder 6 and opening communication between it and the source of air pressure supply. When such latter communication is opened, the air under-pressure enters the cylinder 6 and forces the plunger 7 outward against the tension of the spring 8, thereby releasing the suction force through the stem 9, which holds an article seated on the cup 10 and permits the article to be removed. When another article to be operated on has been placed in proper holding position on the cup 10, the operator releases the control means, thereby permitting it to return to the normal position shown in Fig. 1, which return first closes the air pressure supply valve 23 and opens the exhaust valve 20, thereby permitting the spring 8 to force the plunger 7 inward and effect a pneumatic holding action on the article. This having been accomplished, clutch parts are permitted to return to their normal positions to effect a driving of the rotatable parts.

If there is any leakage within the suction portion of the cylinder 6, which would tend to relieve the suction action on the article and thereby raise it from the spindle when being rotated or operated on, such leakage is compensated for by the action of the spring 8, which continues to force the plunger 7 outward to the limit of its permissible stroke and thereby prolong for some time the constant article-holding suction within the stem 9, even though considerable leakage may occur. For this purpose the initial movement of the plunger 7 in creating an article-holding suction through the stem 9 is only a portion of its full stroke, as illustrated in Fig. 1.

I wish it understood that my invention is not limited to any specific construction, arrangement or form of the parts, as it is capable of embodiments in numerous forms without departing from the spirit of the claims.

Having thus described my invention, what I claim as new and desire to secure by Letters Patent is:

1. In combination with a vacuum actuated work holder, a disconnectible means to rotate the holder, means to supply air to the work holder to release the work including a pair of self closing valves, one operating to admit the air to release the work, and the other operating to exhaust the chuck-releasing pressure, a lever pivoted intermediate said valves adapted to contact alternately therewith, and a single means for successively first disconnecting the rotating means and then engaging the lever for operating the air supplying means whereby to initially disconnect the rotating means and to subsequently operate the air supplying means to release the work holder.

2. In combination with a vacuum actuated work holder, disconnectible means to rotate the holder, means to supply air to the work holder to release the work including a pair of valves, a lever pivoted intermediate said valves adapted to contact alternately therewith to supply and exhaust the air to the work-holder, and cam actuated means for both disconnecting the rotating means and for operating the air supplying means whereby to initially disconnect the rotating means and to subsequently operate the air supplying means to release the work holder.

3. In combination with a vacuum actuated work holder, disconnectible means to rotate the holder, means to supply air to the work holder to release the work, and a single means for both disconnecting the rotating means and for operating the air supplying means, including a pair of pivoted levers, and cam means interposed between the adjacent ends of the levers, whereby to initially disconnect the rotating means and to subsequently operate the air supplying means to release the work holder.

4. In combination with a vacuum actuated work-holder, means to rotate the holder, valve means to supply air to and exhaust it from the work holder to release the work which is normally open to exhaust, and cam actuated means for both disconnecting the rotating means and for operating the valve to supply air whereby to initially disconnect the rotating means and to subsequently operate the air supplying means to release the work-holder.

In testimony whereof I have hereunto signed my name to this specification.

FRANK A. BAILEY.